United States Patent
Rudin (10) Patent No.: US 10,089,269 B2
(45) Date of Patent: Oct. 2, 2018

(54) MOBILE DEVICE, ENGINEERING TOOL DEVICE, SYSTEM AND METHODS FOR CABLE CONFIGURATION IN A PROCESS CONTROL SYSTEM

(71) Applicant: ABB Schweiz AG, Baden (CH)

(72) Inventor: Mikael Rudin, Västerås (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/503,153

(22) PCT Filed: Aug. 13, 2014

(86) PCT No.: PCT/EP2014/067355
§ 371 (c)(1),
(2) Date: Feb. 10, 2017

(87) PCT Pub. No.: WO2016/023583
PCT Pub. Date: Feb. 18, 2016

(65) Prior Publication Data
US 2017/0228331 A1    Aug. 10, 2017

(51) Int. Cl.
*G06F 13/00* (2006.01)
*G06F 3/00* (2006.01)
(Continued)

(52) U.S. Cl.
CPC ........ *G06F 13/362* (2013.01); *G06F 13/4068* (2013.01); *G05B 19/0423* (2013.01); *G05B 2219/25428* (2013.01)

(58) Field of Classification Search
CPC .............. G06F 11/2097; G06F 13/385; G06F 11/2221; G05B 19/0423;
(Continued)

(56) References Cited

U.S. PATENT DOCUMENTS 5,499,188 A * 3/1996 Kline, Jr. ............... G05B 15/02
                                                        700/106
8,351,747 B1    1/2013 Aybay
(Continued)

FOREIGN PATENT DOCUMENTS

JP      S61280126 A    12/1986
WO      9507588 A1     3/1995

OTHER PUBLICATIONS

International Preliminary Report on Patentability Application No. PCT/EP2014/067355 Completed: Oct. 28, 2016 9 pages.
(Continued)

*Primary Examiner* — Faisal M Zaman
(74) *Attorney, Agent, or Firm* — Whitmyer IP Group LLC (57) ABSTRACT

A mobile device for determining cable connections between field devices and I/O modules in a process control system, wherein the mobile device includes a cable interface arranged to be connected to a cable, a user interface configured to receive a user selection of a field device identifier identifying a field device in the process control system, and a processor configured to send an I/O module identification query via the cable interface to an I/O module connected to the cable interface by means of a cable, receive, via the cable interface, I/O module identification data from the I/O module in response to the I/O module identification query, and to associate a user-selected field device identifier with the I/O module identification data received by the processor. An engineering tool device, a system and corresponding methods are also disclosed herein.

22 Claims, 3 Drawing Sheets

(51) Int. Cl.
*G06F 13/362* (2006.01)
*G06F 13/40* (2006.01)
*G05B 19/042* (2006.01)

(58) Field of Classification Search
CPC ........... G05B 2219/25014; G05B 2219/25428; H04L 12/40013; H04L 2012/40221; H04L 2012/40254
USPC .............. 710/2, 104; 700/3, 82; 714/E11.08, 714/E11.081; 370/248
See application file for complete search history.

(56) References Cited

U.S. PATENT DOCUMENTS

| | | | |
|---|---|---|---|
| 8,374,094 B2 | 2/2013 | Law et al. | |
| 8,724,481 B2 * | 5/2014 | Sasaki | G05B 19/4184 370/242 |
| 9,864,357 B2 * | 1/2018 | Mathiowetz | G05B 19/042 |
| 2002/0095515 A1 * | 7/2002 | Christensen | H04L 29/12009 709/245 |
| 2008/0189441 A1 | 8/2008 | Jundt et al. | |
| 2008/0234837 A1 | 9/2008 | Samudrala et al. | |
| 2010/0077111 A1 * | 3/2010 | Holmes | H04L 12/40013 710/33 |
| 2010/0149997 A1 * | 6/2010 | Law | G05B 19/4185 370/248 |

OTHER PUBLICATIONS

International Search Report & Written Opinion of the International Searching Authority Application No. PCT/EP2014/067355 Completed: Oct. 6, 2014; dated Oct. 13, 2014 11 pages.
Written Opinion of the International Preliminary Examining Authority Application No. PCT/EP2014/067355 dated Jun. 28, 2016 9 pages.

* cited by examiner

MOBILE DEVICE, ENGINEERING TOOL DEVICE, SYSTEM AND METHODS FOR CABLE CONFIGURATION IN A PROCESS CONTROL SYSTEM

TECHNICAL FIELD

The present disclosure generally relates to control systems such as process control systems. In particular, the disclosure relates to the procedure of configuring cable connections between field devices and I/O modules.

BACKGROUND

Process control systems typically comprise one or more process controllers communicatively coupled to an operator workstation. The one or more process controller is furthermore communicatively coupled to at least one field device. The communication between the process controller and the field device(s) may be via an analog, a digital or a hybrid communication protocol. Normally, a number of input/output (I/O) modules, or I/O cards, are arranged in the communication path between a process controller and the field devices. The I/O modules form an interface which enables communication between process controllers and field devices.

The field devices, such as device controllers, valve actuators, valve positioners, switches and transmitters, perform functions within the process controlled by the process control system. The field devices send signals to the process controller(s), for example in the form of process variable values, wherein the process controller(s) uses the signal information to implement a control routine, and generate control signals that are sent to the field devices to control the operation of the process.

Configuration, or set-up, of a connection between the process control system and the field devices has traditionally required manual labour, typically carried out by two people. One person being located in the electrical room where the I/O modules are located, and another person in the process environment at the location of the field devices. Connections of cables from I/O modules to field devices have by these people been noted on paper for later basis of marshalling in the process control system. Marshalling refers to the process of defining which I/O module is connected to which field device.

U.S. Pat. No. 8,374,094 discloses methods and systems to verify a communication path between a field device and a process controller in a process control system. In particular, this document discloses a mobile verification controller for verifying a communication path between a process controller and a field device. The verification controller verifies a communication path by sending a command signal to one portion of the process control system and receiving a reception signal from a second portion of the process control system. The verification controller may send a command signal to a verification junction box, coupled between a field device and an I/O card. The verification controller may also send an instruction to the process controller indicating which I/O card to monitor for a verification signal. In response to receiving the command signal, the verification junction box transmits a verification signal to a communicatively coupled I/O card. The I/O card forwards the verification signal to a coupled process controller. The process controller then sends a reception signal to the verification controller. The verification signal may include an identifier of the I/O card that received the verification signal. Upon receiving the reception signal, the verification controller compares the identifier of the I/O card that received the verification signal to the specified I/O card. If the I/O card identifiers match, the communication path is classified as verified.

The procedure disclosed in U.S. Pat. No. 8,374,094 is a validation procedure, which requires that the cable configuration, i.e. connections between I/O cards and field devices, has already been performed.

SUMMARY

In view of the above, an object of the present disclosure is to provide a mobile device, an engineering tool device, a system and methods for facilitating the cable configuration procedure of a process control system.

Hence, according to a first aspect of the present disclosure there is provided a mobile device for determining cable connections between field devices and I/O modules in a process control system. The mobile device comprises a cable interface arranged to be connected to a cable, a user interface configured to receive a user selection of a field device identifier identifying a field device in the process control system, and a processor. The processor is configured to send an I/O module identification query via the cable interface to an I/O module connected to the cable interface by means of a cable. The processor is further configured to receive, via the cable interface, I/O module identification data from the I/O module in response to the I/O module identification query, and to associate a user-selected field device identifier with the I/O module identification data received by the processor.

When configuring, or setting up, the cable connections in a process control system, between I/O modules and field devices, the cable(s), also referred to as field wire(s), connected to an I/O module are connected to the mobile device prior to or in parallel with being connected to a field device. The mobile device then queries the I/O module about a unique identifier of the I/O module. Upon receiving the I/O module identification data, the mobile device associates a user-selected field device identifier with the I/O module identification data. A user may repeat the procedure for all I/O modules and field devices to associate each field device with an I/O module to determine all the connections between I/O modules and field devices. The part of the configuration procedure which determines the connections between I/O modules and field devices may hence be greatly facilitated compared to existing solutions which depend on connection notes on paper. The association of I/O module identification data and field device identifier is carried out automatically, eliminating the risk of human mistakes that may occur when noting down pairs/associations on paper for later manual input into a database in the traditional manner. Furthermore, the associated I/O module identification data and field device identifiers may be used as basis for marshalling a process control system by means of an engineering tool device.

By collecting all pairs of field devices and I/O modules which are to be connected in the manner described above, the pairs of associated I/O module identification data and field device identifiers may be utilised to set up the process control system. In particular, data containing the associated pairs may be provided to a process controller, which then can define the configuration between its input/output channels and the relevant I/O modules for obtaining a desired connection with the field devices that the process controller is to control.

According to one embodiment, the mobile device is configured to send the associated user-selected field device identifier and I/O module identification data to an engineering tool device.

One embodiment comprises a housing, wherein the cable interface and the user interface are arranged within the housing.

One embodiment comprises a first housing comprising the cable interface and a second housing comprising the user interface.

According to one embodiment the cable interface and the user interface are arranged to communicate with each other by means of wireless communication.

According to one embodiment the user interface is configured to display field device identifiers identifying field devices in the process control system, and wherein the user interface is arranged to receive a user selection of any of the displayed field device identifiers.

According to a second aspect of the present disclosure there is provided an engineering tool device configured to be connected to a process controller. The engineering tool device comprises a processor configured to receive a field device identifier and I/O module identification data which are associated with each other and sent by a mobile device. The engineering tool device is further configured to send the I/O module identification data to the process controller, and to receive, from the process controller, I/O module connector identification data of an I/O module connector to which an I/O module associated with the I/O module identification data sent to the process controller is connected.

According to one embodiment the engineering tool device is configured to pair the I/O module connector identification data with the user-selected field device identifier.

Existing process controllers are typically able to identify the I/O module connectors to which they are communicatively coupled. By pairing the I/O module connector identification data with the corresponding I/O module identification data a path from the process controller to a field device, via an I/O module may be obtained. In this manner marshalling of a process control system may be provided with a very small amount of human interaction involved.

Additionally, re-configuration, e.g. replacement of an I/O module in an I/O module cabinet with another I/O module, which is to be connected to the same field device or to another field device, is also facilitated.

According to one embodiment the I/O module connector identification data comprises a physical address of an I/O module connector to which the I/O module is connected.

According to one embodiment the engineering tool device is configured to transfer the pair of module connector identification data and user-selected field device identifier to a process control system.

According to a third aspect of the present disclosure there is provided a system for setting up cable connections between field devices and I/O modules in a process control system, wherein the system comprises: a mobile device according to the first aspect, and an engineering tool device according to the second aspect.

According to one embodiment the mobile device and the engineering tool device are arranged to communicate wirelessly.

One embodiment comprises a housing, wherein the mobile device and the engineering tool device are arranged in the housing.

According to one embodiment the engineering tool device is configured to transfer the pair of I/O module connector identification data and user-selected field device identifier to an engineering database storing engineering data related to a process control system.

According to a fourth aspect of the present disclosure there is provided a method of determining cable connections between field devices and I/O modules in a process control system, by means of a mobile device. The method comprises: sending an I/O module identification query to an I/O module, which I/O module is connected to a cable interface of the mobile configuration device by means of a cable, wherein the I/O module identification query is sent to the I/O module via the cable interface and the cable, receiving I/O module identification data from the I/O module in response to the sent I/O module identification query, which I/O module identification data is received via the cable interface. The method further comprises receiving a user selection of a field device identifier identifying a field device in the process control system by means of a user interface, and associating the user-selected field device identifier with the received I/O module identification data.

One embodiment comprises sending the associated user field device identifier and I/O module identification data to an engineering tool device.

According to a fifth aspect of the present disclosure there is provided a computer program product comprising computer-executable components, which when run on a processor cause a mobile device to send an I/O module identification query to an I/O module, which I/O module is connected to a cable interface of the mobile configuration device by means of a cable, wherein the I/O module identification query is sent to the I/O module via the cable interface. The computer-executable components also cause the mobile device to receive I/O module identification data from the I/O module in response to the sent I/O module identification query, which I/O module identification data is received via the cable interface, display field device identifiers identifying field devices in the process control system by means of a user interface, receive a user selection of any of the field device identifiers, and to associate the user-selected field device identifier with the received I/O module identification data.

According to a sixth aspect of the present disclosure there is provided a method of setting up cable connections between field devices and I/O modules in a process control system, by means of an engineering tool device. The method comprises: receiving, from a mobile device, I/O module identification data and a field device identifier which are associated with each other, sending the I/O module identification data to a process controller, receiving, from the process controller, I/O module connector identification data of an I/O module connector to which an I/O module associated with the I/O module identification data is connected, from the process controller, and pairing the I/O module connector identification data with the user-selected field device identifier.

According to a seventh aspect of the present disclosure there is provided a computer program product comprising computer-executable components which when run on a processor causes an engineering tool device to receive, from a mobile device, I/O module identification data and a field device identifier which are associated with each other, send the I/O module identification data to a process controller, receive, from the process controller, I/O module connector identification data of an I/O module connector to which an I/O module associated with the I/O module identification data is connected, and pair the I/O module connector identification data with the user-selected field device identifier.

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc., unless explicitly stated otherwise. Furthermore, any steps of a method need not necessarily be performed in the described order unless explicitly stated.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. It may further be mentioned that multiple references to "one embodiment", "one variation" or "an embodiment" is not necessarily a reference to the one and same embodiment/variation.

The mobile device and the engineering tool device disclosed herein are designed to facilitate configuration of the wiring between I/O modules and field devices in a process control system. In particular, the mobile configuration device and the engineering tool device are adapted to facilitate the configuration, or marshalling, of a process control system. With marshalling is meant defining the physical connections between I/O modules and field devices, to enable the process controller(s) to obtain a configuration between its/their input/output channels and the field devices.

Figure 1:
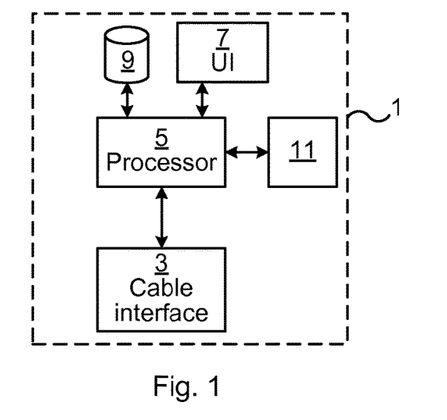
FIG. 1 schematically shows an example of a mobile device.

FIG. 1 depicts an example of a mobile device 1. The mobile device 1 comprises a cable interface 3. The cable interface 3 is adapted to be communicatively connected to a cable for connection to a field device. To this end, the cable interface 3 may be adapted to enable mechanical connection with cables, or wires, which run from I/O modules and which are intended to be connected to field devices. Alternatively, or additionally, the cable interface 3 may be adapted to enable mechanical connection with cable connection points of terminal blocks to which a field device is connected. The cable interface 3 may thus for example comprise one or more cable sockets, connectors or cable connection point members.

The cable interface 3 may according to one variation be arranged to be connected to only one cable at a time. Alternatively, the cable interface 3 may be arranged to be connected to a set of cables simultaneously, all of them for connection with a single field device.

The cable interface 3 may be arranged to receive and transmit signals that are analogue, digital, or hybrid, i.e. both analog and digital. The cable interface 3 may thus be adapted to be connected to cables which communicate via an analog protocol, a digital protocol, or a hybrid protocol. Typically, the communication between the cable interface 3 and an I/O module is via a digital protocol.

The mobile device 1 comprises a user interface (UI) 7 which according to this example embodiment is configured to display field device identifiers. The user interface 7 may thus comprise a display screen. Each field device identifier may comprise the name of the corresponding field device. The field device identifiers may for example be presented in a list on the display screen and may have been preloaded with the field device identifiers of the field devices that are to be used in a process control system to be marshaled.

The user interface 7 comprises an input device, for example a keyboard, a pointer device, and/or a touch screen. A user may thereby interact with the mobile device 1 via the user interface 7. The user interface 7 is configured to receive a user selection a field device identifier. If the user interface displays a list of field device identifiers available for selection, the selection by the user of any of the field device identifiers displayed may be facilitated by e.g. pointing and clicking on the field device identifier to select. In alternative embodiments where there is no list of field device identifiers displayed, the user may type in the field device identifier to be selected.

The mobile device 1 further comprises a processor 5. The processor 5 is communicatively coupled to the cable interface 3 and to the user interface 7. The processor 5 is configured to send an I/O module identification query to an I/O module connected by means of a cable to the mobile device 1, via the cable interface 3.

The I/O module identification query is according to one variation sent automatically by the processor 5 when a cable is connected to the cable interface 3. The processor 5 may according to one variation be able detect when a cable is connected to the cable interface 3. According to one variation, the processor 5 is notified of a cable being connected to the cable interface 3 by manual user interaction, for example via the user interface 7.

The processor 5 is configured to receive I/O module identification data sent by the I/O module over a cable connected to the cable interface 3. The I/O module identification data is sent by the I/O module in response to the I/O module identification query sent by the processor 5.

The processor 5 is arranged to associate the user-selected field device identifier with the I/O module identification data received by the processor 5.

The mobile device 1 may further comprise a storage unit 9 communicatively coupled to the processor 5. The storage unit 9 may comprise computer executable components which when run on the processor 5 causes the mobile device 1 to perform methods disclosed herein. Furthermore, according to one variation, the storage unit 9 is configured to store the associations between I/O module identification data and field device identifiers.

The mobile device 1 may further comprise a communication unit 11 communicatively coupled to the processor 5. The communication unit 11 is configured to send pairs of user-selected field device identifier and I/O module identification data, which have been associated by the processor 5, to an engineering tool device 13. The communication unit 11 may be configured to provide wireless communication with the engineering tool device 13, or it may be configured to provide communication with the engineering tool device 13 by means of wires. The communication unit 11 may thus in the former case comprise an antenna.

According to one variation the mobile device 1 has a single housing comprising the user interface 7, the cable interface 3, the processor 5, and the storage unit 9. To this end, the mobile device 1 may form a single integrated unit contained within a single housing and connected by means of wires.

Alternatively, the mobile device 1 may comprise a first housing comprising cable interface 3 and a second housing comprising the user interface 7. The first housing and the second housing may be physically separate units. The cable interface 3 and the user interface 7 may be communicatively coupled for example by means of a cable, or wirelessly, e.g. by means of a wireless communication network, such as a wide area network or a personal area network. The user interface 3 may in this case for example be a portable computer, a smart phone or a tablet computer.

Figure 2:
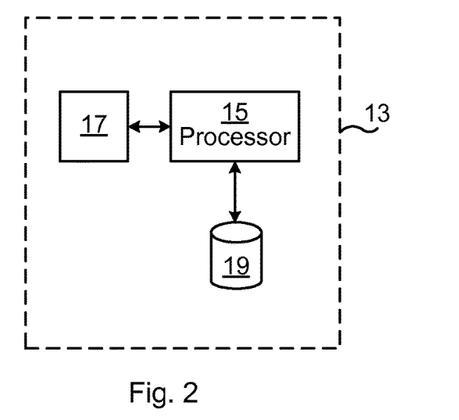
FIG. 2 schematically depicts an example of an engineering tool device.

FIG. 2 depicts a schematic diagram of an engineering tool device 13. The engineering tool device 13 is configured to be communicatively coupled to a process controller.

The engineering tool device comprises a processor 15 and a communication unit 17 communicatively coupled to the processor 15. The communication unit 17 may be configured to communicate with the mobile device 1 and with a process controller. The communication unit 17 may be arranged to communicate wirelessly or by means of wires with the mobile device 1. The communication unit 17 may be arranged to communicate wirelessly or by means of wires with a process controller.

The processor 15 is, via the communication unit 17, configured to receive a user-selected field device identifier and I/O module identification data which are associated with each other and sent by the mobile device 1. The processor 15 is configured to send the I/O module identification data to a process controller.

The processor 15 is further configured to receive, in response to sent I/O module identification data, I/O module connector identification data of an I/O module connector to which an I/O module associated with the I/O module identification data is connected, from a process controller. The I/O module connector identification data may comprise a physical address of the I/O module connector to which the I/O module is connected.

The processor 15 is configured to pair the I/O module connector identification data with the user-selected field device identifier. In this manner, a path between the controller logic, the I/O module and the corresponding field device may be established.

The engineering tool device 13 may further comprise a storage unit 19 communicatively coupled to the processor 15. The storage unit 19 may comprise computer executable components which when run on the processor 15 causes the engineering tool device 13 to perform methods disclosed herein. Furthermore, according to one variation, the storage unit 9 is configured to store the pairs of I/O module connector identification data and user-selected field device identifiers.

Figure 3:
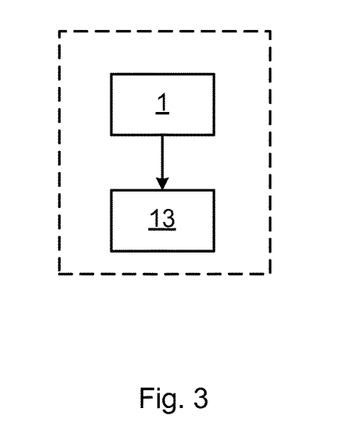
FIG. 3 schematically depicts an example of an integrated system comprising the mobile device in FIG. 1 and the engineering tool device in FIG. 2.

The mobile device 1 and the engineering tool device 13 together form a system for configuring a process control system. The mobile device 1 and the engineering tool device 13 may be two separate devices configured to communicate with each other wirelessly or by means of wires. Alternatively, the mobile device 1 and the engineering tool device 13 may be contained within a single housing, thus forming an integrated portable unit, as shown in FIG. 3.

Figure 4:
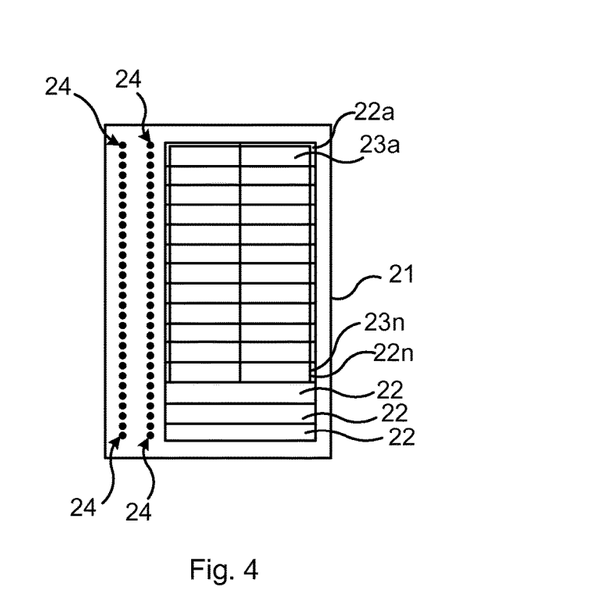
FIG. 4 schematically depicts a front view of an example of an I/O module cabinet and I/O modules connected to I/O module connectors of the I/O module cabinet.

FIG. 4 depicts an I/O module cabinet 21 which has a plurality of I/O module connectors 22*a-n*, 22. The I/O module cabinet 21 is arranged to receive a plurality of I/O modules 23*a*-23*n*, which are connectable to the I/O module connectors 22*a-n*, 22. A connection between the I/O modules and process controller may thereby be established. In FIG. 4 vacant I/O module connectors with no I/O module connected are denoted by reference numeral 22 while the I/O modules connectors to which the I/O modules 23*a-n* are connected are denoted by reference numerals 22*a-n*.

Each I/O module connector 22*a-n*, 22 has a physical address. Each I/O module connector 22*a-n*, 22 may by a process controller be seen as a node in a communication network. Each such node is identified by a process controller by means of the physical address of the corresponding I/O module connector 22*a-n*, 22. Process controllers can thereby communicate with I/O modules connected to I/O module connectors 22*a-n*, 22.

The I/O module cabinet 21 further comprises a plurality of cable connectors 24. Each I/O module connector 22*a-n*, 22 is associated with a number of cable connectors 24. In the example in FIG. 4, four cable connectors 24 are associated with each I/O module connector 22*a-n*, 22; any number of connectors is however contemplated. Each cable connector 24 is adapted to be connected to a cable which at its other end is to be connected to a field device. Prior to connection to a field device, the free end of such cables may be connected to the mobile device 1 to associate an I/O module connected to an I/O module connector with a field device. Alternatively, the cables may already be connected between a cable connector 24 of the I/O module cabinet 21 and a field device. The cable may for example be connected to a terminal block to which the field device is connected. The cable interface 3 may in this case be connected to the terminal block at a cable connection point, which provides a communicative coupling between the cable interface 3 and the cable.

Each cable connector 24 is communicatively coupled to only one I/O module connector. In this manner, a communication path between a field device and an I/O module may be obtained.

According to one variation, each I/O module is adapted to be connected to only one field device. In this sense, the I/O modules may be seen as single channel I/O modules. This may be the case even in variations where each I/O module is connectable to a field device with several cables via cable connectors 24, i.e. if several cable connectors 24 are associated with the same I/O module connector.

Each I/O module 23*a*-23*n* is associated with a unique identifier, such as a serial number. Thus, when the mobile device 1 sends an I/O module identification query, the I/O module is able to respond by sending I/O module identification data which includes the unique identifier.

Furthermore, the I/O module cabinet 21 stores a plurality of unique I/O module connector identifiers, also referred to as channel positions or physical address, one for each I/O module connector. Thus, when the engineering tool device 13 sends I/O module identification data to the process controller, the process controller locates the I/O module connector, by means of the physical address of the I/O module connector, to which the I/O module associated with the I/O module identification data is connected. Then, the I/O module cabinet, or the I/O module connector in question sends, to the process controller, I/O module connector identification data of the I/O module connector to which the I/O module is connected.

Figure 6:
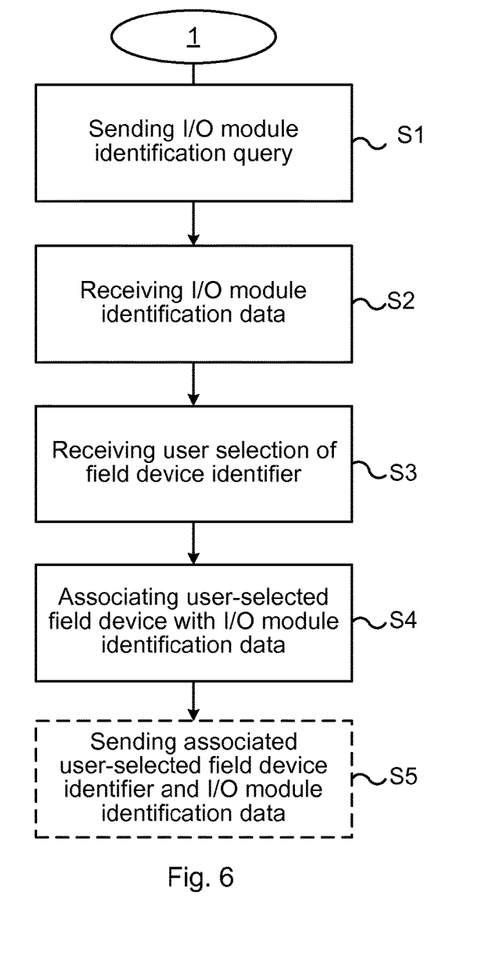
FIG. 6 is a flowchart of a method of determining cable connections between field devices and I/O modules in a process control system by means of the mobile device in FIG. 1.
Figure 7:
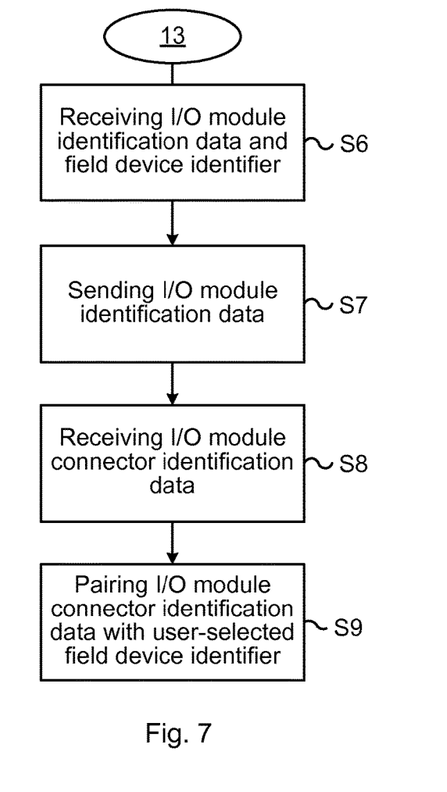
FIG. 7 is a flowchart of a method of setting up cable connections between field devices and I/O modules in a process control system by means of the engineering tool device in FIG. 2.

Methods of configuring a process control system will now be described with reference to FIGS. 5 to 7.

Figure 5:
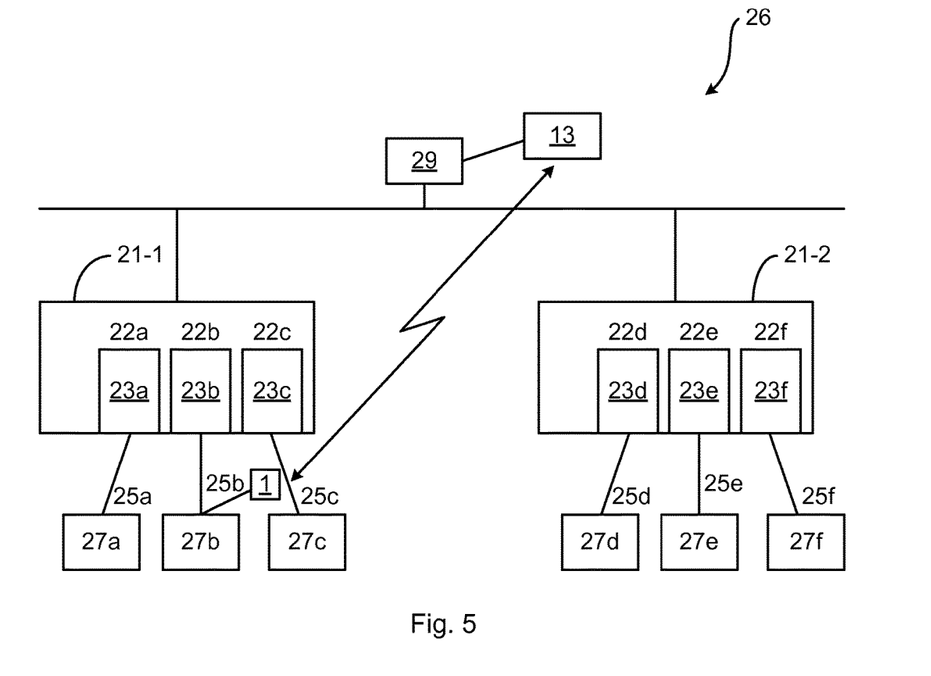
FIG. 5 schematically illustrates a process control system.

FIG. 5 depicts an example of a process control system 26 comprising a process controller 29, I/O module cabinets 21-1 and 21-2, I/O modules 23a-23c arranged in I/O module cabinet 21-1 and connected to a respective I/O module connector 22a-22c, and I/O modules 23d-23f arranged in I/O module cabinet 21-2 and connected to a respective I/O module connector 21d-21f.

Each I/O module 23a-23c is connected to a respective cable 25a-25c, i.e. field wire, and a respective field device 27a-27c. Each I/O module 23d-23f is connected to a respective cable 25d-25f, i.e. field wire.

According to the example, the mobile device 1, in particular the cable interface 3, is communicatively coupled to cable 25b which is connected to I/O module 23b. I/O module 23b is connected to the process controller 29 via I/O module connector 22b.

The engineering tool device 13 is communicatively coupled to the process controller 29, wirelessly or by means of wires. The engineering tool device 13 is furthermore communicatively coupled to the mobile device 1, wirelessly or by means of wires.

In a typical situation, a user carries the mobile device 1 when configuring the process control system 26. The user may plug in a cable, e.g. cable 25b to the cable interface 3 of the mobile device 1. Alternatively, the user may plug in the cable interface 3 to a cable connection point of a terminal block to which the field device is connected and to which the cable 25b is connected. The field device 27b and the I/O module 23b may hence already be communicatively coupled when performing the configuration.

The mobile device 1 may then send an I/O module identification query to I/O module 23b which is connected to cable 25b. As previously described, this may either be performed automatically in response to detecting that the cable 25b has been communicatively coupled to the cable interface 3, or manually for example by means of a user input to the user interface 7. Thus, in a step S1, the processor 5 sends the I/O module identification query to the I/O module 23b. When the I/O module 23b has received the I/O module identification query, the I/O module 23b sends I/O module identification data to the mobile device 1 via the cable 25b. This I/O module identification data comprises the unique identifier of the I/O module 23b, e.g. "I/O module 23b".

In a step S2, the processor 5 receives the I/O module identification data sent by the I/O module 23b.

In a step S3, a user selection of a field device identifier is received by the user interface 7. The user selection may for example be a manual input of the name of a field device, for example by writing the entire name or part of the name of a field device. In the present example this could mean inputting "field device 27b".

Alternatively, the user selection received by the user interface 7 may be a selection of a field device identifier of a plurality of field device identifiers displayed on the display screen of the mobile device 1. The user interface 7 may thus display field device identifiers of the field devices in the process control system. In this case, typically all of the field devices, or a subset of field devices, to be installed in the process control system 26 can be displayed on the display screen, for example in a list. The field device identifiers are selectable by the user by means of a user input. The user interface 7 is hence configured to receive a user selection of any of the field device identifiers displayed.

It should be noted that step S3 may be carried out prior to or after steps S1 and S2.

In a step S4 the user-selected field device identifier is associated with the I/O module identification data. The association of these parameters may be stored in the storage unit 9, and/or it may be sent to the engineering tool device 13 in a step S5. That the user-selected field device identifier is associated with the I/O module identification data may for example mean that the user-selected field device identifier and I/O module identification data are stored together in the storage unit 9. Alternatively, it may mean that the user-selected field device identifier and the I/O module identification data are sent to the engineering tool device 13 for example in a common data packet, or in separate data packets in a manner which enables the engineering tool device 13 to conclude that received user-selected field device identifier and I/O module identification data are related to each other. When this procedure has been carried out, the user disconnects the cable interface 3 from its connection with cable 25b.

The procedure can be repeated for all of the field devices in a process control system. In this manner all I/O modules and all field devices may be associated or paired.

In a step S6 the processor 15 of the engineering tool device 13 receives from the mobile device 1 the I/O module identification data and a field device identifier which are associated with each other. In this example, "field device 23b" and "I/O module 23b".

In a step S7 the processor 15 of the engineering tool device 13 sends the I/O module identification data to the process controller 29.

The process controller 29 may then in a known manner collect the corresponding pair of I/O module identification data and I/O module connector identification data of that I/O module connector 22b to which the I/O module 23b in question is connected, and send the I/O module connector identification data to the engineering tool device 13.

In a step S8 the processor 15 of the engineering tool device 13 receives the I/O module connector identification data, from the process controller 29.

In a step S9 the processor 15 of the engineering tool device 13 pairs the I/O module connector identification data with the user-selected field device identifier. In this manner the path between process controller input/output channels and field devices may be obtained and the process control system 26 may thus be marshaled. In particular, the pairs of I/O module connector identification data and user-selected field device data may be sent/uploaded to an engineering database storing engineering data related to the process control system 26, to establish the marshalling, i.e. connections between process controller and field devices. The pairs may for example be uploaded to the engineering database of the process control system subsequently after a pair has been determined or when all pairs have been determined.

It should be noted that step S4 of sending may involve sending the associated user-selected field device identifier and I/O module identification data between two physically separate devices, as shown in FIG. 5, or it could mean sending between two software modules within the same device, for example in case of an integrated system as shown in FIG. 3. In the case of an integrated system, it should be noted that processors 5 and 15 may form a single processor, i.e. they may be the same processor. Similar considerations apply to the corresponding step S6 of receiving.

Furthermore, variations of the engineering tool device in which it is integrated with the process controller are also envisioned. In such variations the sending of step S7 and receiving of step S8 should be construed to mean communication between different software modules within the same device, i.e. the process controller. In this case, the process controller already is in possession of the marshalling, since it is included in the engineering tool device. The configuration of the process control system may in this case be obtained without having to transfer/upload the pairs of I/O module connectors and field device identifiers.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A mobile device for determining cable connections between field devices and I/O modules in a process control system, wherein the mobile device comprises:
   a cable interface arranged to be connected to a cable;
   a user interface configured to receive a user selection of a field device identifier identifying a field device in the process control system; and
   a processor configured to:
      send an I/O module identification query via the cable interface to an I/O module connected to the cable interface by means of a cable;
      receive, via the cable interface, I/O module identification data from the I/O module in response to the I/O module identification query; and
      associate a user-selected field device identifier with the I/O module identification data received by the processor.

2. The mobile device as claimed in claim 1, wherein the mobile device is configured to send the associated user-selected field device identifier and I/O module identification data to an engineering tool device.

3. The mobile device as claimed in claim 1, comprising a housing, wherein the cable interface and the user interface are arranged within the housing.

4. The mobile device as claimed in claim 1, comprising a first housing comprising the cable interface and a second housing comprising the user interface.

5. The mobile device as claimed in claim 4, wherein the cable interface and the user interface are arranged to communicate with each other by means of wireless communication.

6. The mobile device as claimed in claim 1, wherein the user interface is configured to display field device identifiers identifying field devices in the process control system, and wherein the user interface is arranged to receive a user selection of any of the displayed field device identifiers.

7. An engineering tool device configured to be connected to a process controller, wherein the engineering tool device comprises:
   a processor configured to:
      receive a field device identifier and associated I/O module identification data from a mobile device;
      send the I/O module identification data to the process controller; and
      receive, from the process controller, I/O module connector identification data of an I/O module connector to which an I/O module associated with the I/O module identification data is connected.

8. The engineering tool device as claimed in claim 7, configured to pair the I/O module connector identification data with the field device identifier.

9. The engineering tool device as claimed in claim 7, wherein the I/O module connector identification data comprises a physical address of the I/O module connector to which the I/O module is connected.

10. The engineering tool device as claimed in claim 8, configured to transfer the pair of I/O module connector identification data and user-selected field device identifier to an engineering database storing engineering data related to a process control system.

11. A system for setting up cable connections between field devices and I/O modules in a process control system, wherein the system comprises:
   a mobile device for determining cable connections between field devices and I/O modules in a process control system, wherein the mobile device comprises:
      a cable interface arranged to be connected to a cable;
      a user interface configured to receive a user selection of a field device identifier identifying a field device in the process control system; and
      a processor configured to:
         send an I/O module identification query via the cable interface to an I/O module connected to the cable interface by means of a cable;
         receive, via the cable interface, I/O module identification data from the I/O module in response to the I/O module identification query; and
         associate a user-selected field device identifier with the I/O module identification data received by the processor; and
   an engineering tool device.

12. The system as claimed in 11, wherein the mobile device and the engineering tool device are arranged to communicate wirelessly.

13. The system as claimed in claim 11, comprising a housing, wherein the mobile device and the engineering tool device are arranged in the housing.

14. A method of determining cable connections between field devices and I/O modules in a process control system, by means of a mobile device, wherein the method comprises:
   sending an I/O module identification query to an I/O module, which I/O module is connected to a cable interface of the mobile configuration device by means of a cable, wherein the I/O module identification query is sent to the I/O module via the cable interface;
   receiving I/O module identification data from the I/O module in response to the sent I/O module identification query, which I/O module identification data is received via the cable interface;
   receiving a user selection of a field device identifier identifying a field device in the process control system by means of a user interface; and
   associating the user-selected field device identifier with the received I/O module identification data.

15. The method as claimed in claim 14, comprising sending the associated user-selected field device identifier and I/O module identification data to an engineering tool device.

16. A computer program product comprising computer-executable components, which when run on a processor of a mobile device cause the mobile device to:
  send an I/O module identification query to an I/O module, which I/O module is connected to a cable interface of the mobile device by means of a cable, wherein the I/O module identification query is sent to the I/O module via the cable interface;
  receive I/O module identification data from the I/O module in response to the sent I/O module identification query, which I/O module identification data is received via the cable interface;
  receive a user selection of a field device identifier; and
  associate a user-selected field device identifier with the received I/O module identification data.

17. A method of setting up cable connections between field devices and I/O modules in a process control system, by means of an engineering tool device, wherein the method comprises:
  receiving, from a mobile device, I/O module identification data and an associated field device identifier;
  sending the I/O module identification data to a process controller;
  receiving, from the process controller, I/O module connector identification data of an I/O module connector to which an I/O module associated with the I/O module identification data is connected; and
  pairing the I/O module connector identification data with the user-selected field device identifier.

18. A computer program product comprising computer-executable components which when run on a processor of an engineering tool device cause the engineering tool device to:
  receive, from a mobile device, I/O module identification data and an associated field device identifier;
  send the I/O module identification data to a process controller;
  receive, from the process controller, I/O module connector identification data of an I/O module connector to which an I/O module associated with the I/O module identification data is connected; and
  pair the I/O module connector identification data with the user-selected field device identifier.

19. The mobile device as claimed in claim 2, comprising a housing, wherein the cable interface and the user interface are arranged within the housing.

20. The mobile device as claimed in claim 2, comprising a first housing comprising the cable interface and a second housing comprising the user interface.

21. The engineering tool device as claimed in claim 8, wherein the I/O module connector identification data comprises a physical address of the I/O module connector to which the I/O module is connected.

22. The engineering tool device as claimed in claim 9, configured to transfer the pair of I/O module connector identification data and user-selected field device identifier to an engineering database storing engineering data related to a process control system.

* * * * *